US005758221A

United States Patent [19]

Cho

[11] Patent Number: 5,758,221

[45] Date of Patent: May 26, 1998

[54] APPARATUS FOR PHOTOLITHOGRAPHIC EXPOSURE OF CATHODE RAY TUBE

[75] Inventor: Jong-ho Cho, Kwachun, Rep. of Korea

[73] Assignee: Samsung Display Devices Co., Ltd., Kyungki-do, Rep. of Korea

[21] Appl. No.: 550,938

[22] Filed: Oct. 31, 1995

[30] Foreign Application Priority Data

Dec. 7, 1994 [KR] Rep. of Korea ........................ 94-33105

[51] Int. Cl.$^6$ ........................................ G03B 41/00

[52] U.S. Cl. ........................................ 396/547

[58] Field of Search ........................................ 396/546, 547

[56] References Cited

U.S. PATENT DOCUMENTS

| | | | |
|---|---|---|---|
| 4,256,390 | 3/1981 | Fisher et al. | 396/547 |
| 5,221,938 | 6/1993 | Kim | 396/546 |

FOREIGN PATENT DOCUMENTS

| | | |
|---|---|---|
| 57-128435 | 8/1982 | Japan . |
| 62-26740 | 2/1987 | Japan . |
| 2-87443 | 3/1990 | Japan . |
| 3-159024 | 7/1991 | Japan . |
| 4-301337 | 10/1992 | Japan . |

*Primary Examiner*—Fred L. Braun
*Attorney, Agent, or Firm*—Leydig, Voit & Mayer, Ltd.

[57] ABSTRACT

An apparatus for exposing a color cathode ray tube includes a light source producing light for exposing parts of the color cathode ray tube during manufacture of the tube. A slit disposed near the light source permits adjustment of the size of an exposure pattern produced by light from the light source and passing through the slit. The light source is mounted on a support that is moved in each of two orthogonal directions. The support may be driven by a cam assembly. The apparatus produces a cathode ray tube including dots of phosphor producing particular colors in response to an incident electron beam, the dots having improved circularity and boundary definition. The apparatus can also be employed to produce a cathode ray tube with a linear stripe pattern by moving the light source in only one direction during the exposure process.

7 Claims, 5 Drawing Sheets

APPARATUS FOR PHOTOLITHOGRAPHIC EXPOSURE OF CATHODE RAY TUBE

BACKGROUND OF THE INVENTION

The present invention relates to an exposing apparatus for a color cathode ray tube and, more particularly, to an exposing apparatus for a color cathode ray tube which can adjust stripe-shaped or dot-shaped exposure patterns formed by a light source on a cathode ray tube panel, in an exposing process for manufacturing a color cathode ray tube.

In an electro-photographic manufacturing process of a color cathode ray tube, exposure is performed by exposing to light rays the inner surface of a panel of the color cathode ray tube uniformly maintained at a positive charge in accordance with the pattern of a shadow mask so as to discharge the positive charge therefrom. For this purpose, a positively charged photo-conductive layer 11 becomes locally conductive by means of light energy, as shown in FIG. 1. Here, reference numerals 12 and 13 denote a conductive layer and a cathode ray tube panel, respectively. In FIG. 2, the spectral characteristic of a commonly used photo-conductive material having such properties is shown by curve 21, and, accordingly, a lamp having, e.g., the spectral characteristics indicated by curve 22 (e.g., a xenon lamp) should be used as a light source.

FIG. 3 schematically shows the structure of a conventional xenon lamp, and FIG. 4 is a schematic diagram showing an exposure system utilizing the conventional xenon lamp.

Referring to FIG. 3, the conventional xenon lamp 30 is provided with a predetermined form of glass tube 31. Two electrodes **32*a* and 32*b*, respectively extending from either end of glass tube 31 lengthwise toward the center of the tube, are placed in glass tube 31, and the tips of electrodes 32*a* and 32*b* are covered with metal caps 33*a* and 33*b***, respectively.

Referring to FIG. 4, the conventional exposure system 40 is provided with a xenon lamp 41 as a light source, and a slit 42, a corrective lens 43 and a light quantity corrective filter 44 are arranged in turn from the lamp 41 between the lamp 41 and a cathode ray tube panel 45. Reference numeral **45*s*** denotes a shadow mask.

According to such a conventional exposure system 40, the light rays emitted from xenon lamp 41, to pass through slit 42 and corrective lens 43, are corrected in light quantity by light corrective filter 44 and impinge on the inner surface of panel 45. Thus, the exposure of the color cathode ray tube is performed by the incident light rays.

However, since the conventional exposure system affords a quite short exposure time of just a few milliseconds, the system does not permit an exposure pattern correcting time, thereby deteriorating the linearity of a stripe-shaped exposure pattern and the circularity of a dot-shaped exposure pattern, produced by the light source 41. Other disadvantages that arise from the short exposure time are the difficulty of precise position setting of the light quantity corrective filter 44 and the possibility of non-uniformity in exposure size in neighboring areas with respect to the center of the panel of the cathode ray tube.

SUMMARY OF THE INVENTION

To solve these problems, it is an object of the present invention to provide a color cathode ray tube exposure apparatus which can improve linearity in stripe-shaped exposure patterns and circularity and clarity in dot-shaped exposure patterns, in an exposing process of the electro-photographic manufacturing of a color cathode ray tube.

In order to achieve the above object of the present invention, there is provided an apparatus for exposing the inner surface of a color cathode ray tube in an exposing process for electro-photographically manufacturing the color cathode ray tube, the apparatus comprising: a light source for exposing the inner surface of the color cathode ray tube; continuous light-emitting circuit means electrically connected to the light source for causing the light source to continuously emit light rays; a slit arranged close to the light source, for adjusting the size of an exposure pattern produced by the light source; supporting means for supporting and fixing said light source; and moving means installed below the supporting means for moving the supporting means vertically and horizontally.

As described above, the color cathode ray tube exposure apparatus according to the present invention is provided with the moving means for moving the light source vertically and horizontally, so that the circularity of an assumed dot exposure pattern, the clarity of the boundary thereof, and the linearity of an assumed stripe exposure can be improved.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE EMBODIMENT

Figure 5:
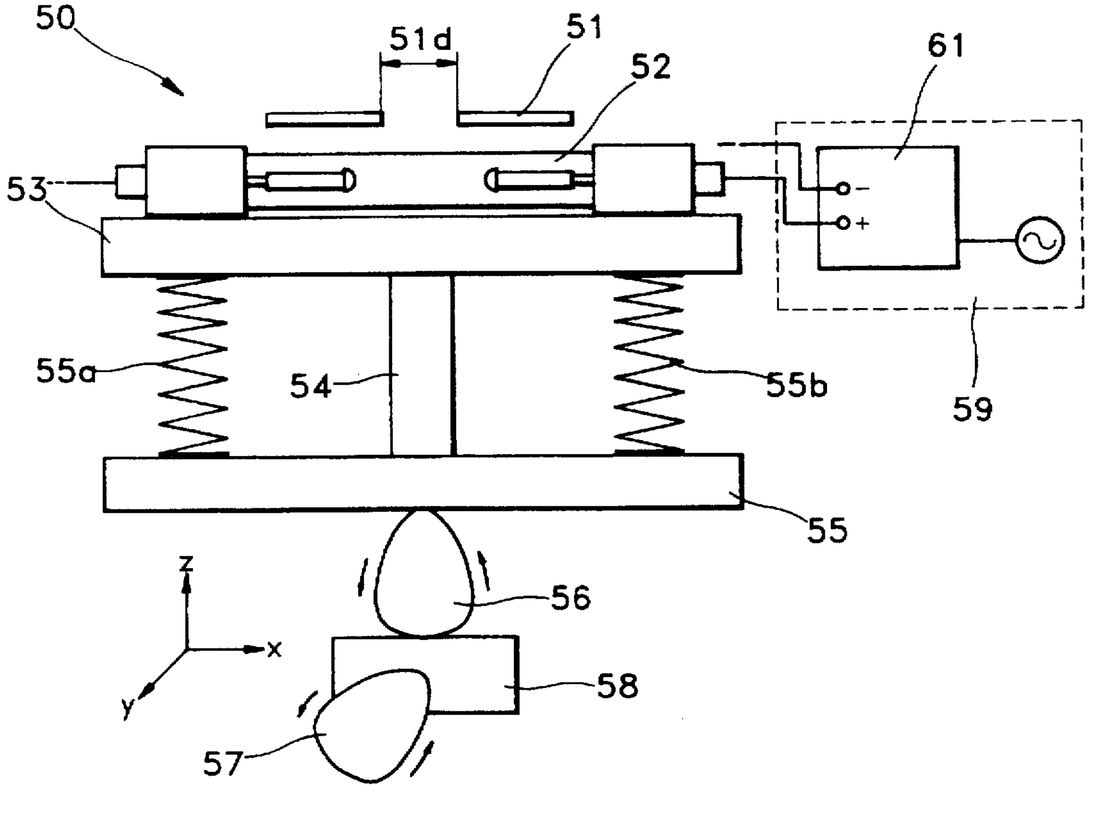
FIG. 5 is a schematic diagram showing a color cathode ray tube exposure apparatus according to the present invention.
Figure 6:
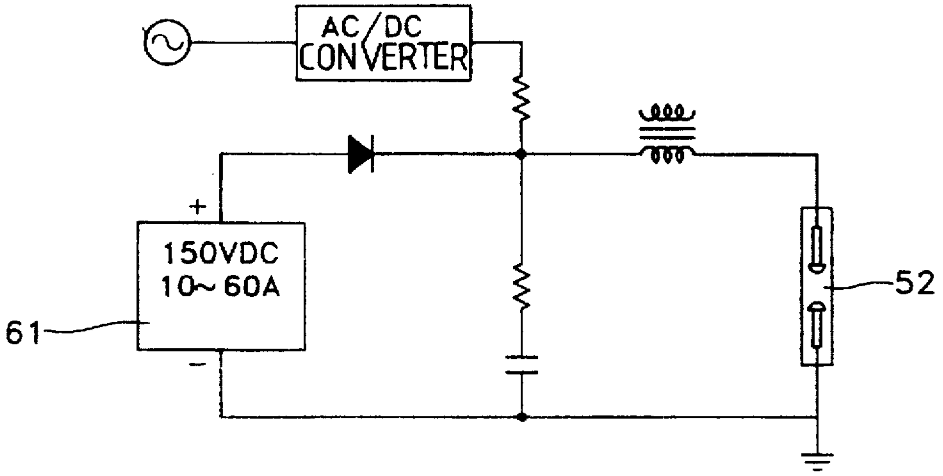
FIG. 6 is a circuit diagram schematically showing a continuous light emitting circuit in the exposure apparatus shown in FIG. 5.

Referring to FIG. 5, a dot-type cathode ray tube exposure apparatus 50 which is a color cathode ray tube exposure apparatus according to the present invention is illustrated. An exposure apparatus 50 is provided with a xenon lamp 52 used as a light source for exposing the inner surface of the cathode ray tube. A plate 51 including a slit of width **51*d* is arranged close to lamp 52 for adjusting a dot-shaped exposure pattern size. A light source supporting plate 53 as a supporting means is placed below lamp 52 for supporting and fixing the lamp 52. One end of a central shaft 54 is connected vertically to the center of the light source supporting plate 53. A cam contact plate 55 is connected to the other end of central shaft 54, parallel to the light source supporting plate 53. A z-axis direction cam 56 and a y-axis direction cam 57 are installed below cam contact plate 55 at right angles with each other with respect to a cam supporting member 58 which connects the cams, for moving the light source in the directions of a y-axis and a z-axis. A continuous light-emitting circuit 59 having an auxiliary direct current (DC) power source 61 illustrated in FIG. 6 is electrically connected to the lamp 52 for causing the lamp 52 to continuously emit light rays. Reference numerals 55***a* and 55*b* denote buffer springs.

Figure 7:
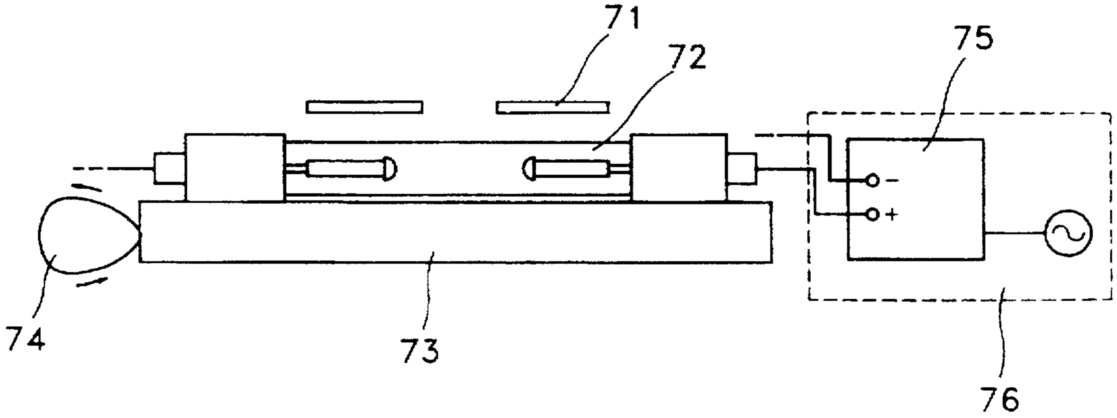
FIG. 7 is a schematic diagram showing a color cathode ray tube exposure apparatus according to another embodiment of the present invention.

In FIG. 7, illustrating a stripe-type cathode ray tube exposure apparatus for a color cathode ray tube according to another embodiment of the present invention, the exposure apparatus comprises a xenon lamp 72 as a light source for exposing the inner surface of the cathode ray tube, a plate 71 with a slit arranged close to the lamp 72 for adjusting a stripe-shaped exposure pattern size, a light source supporting plate 73 as a supporting means below the lamp 72 for supporting and fixing the lamp 72, a cam 74 attached onto one end of the light source supporting plate 73 for horizontally moving the plate 73, and a continuous light-emitting circuit 76 having an auxiliary DC power source 75, electrically connected to the lamp 72.

The operations of the color cathode ray tube exposure apparatus according to two embodiments of the present invention having the above constructions will be explained with reference to FIGS. 5–11.

Figure 1:
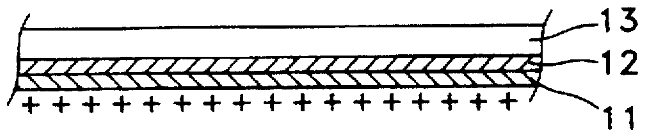
FIG.1(PRIOR ART)
FIG. 1 is a partially extracted cross-sectional view showing the inner state of a panel of a conventional color cathode ray tube just before exposure.
Figure 2:
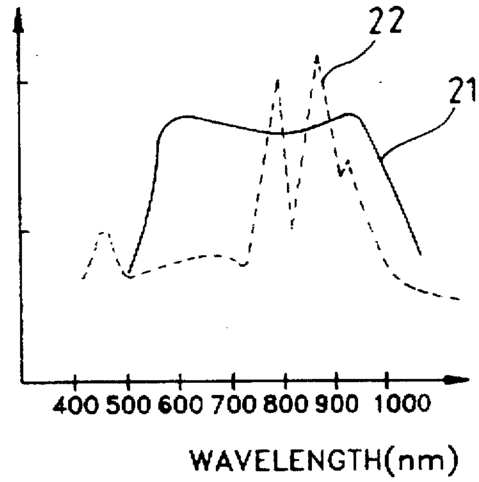
FIG.2(PRIOR ART)
FIG. 2 is a graph showing the spectral characteristics of a conventional xenon lamp and the total luminous intensity thereof.
Figure 3:
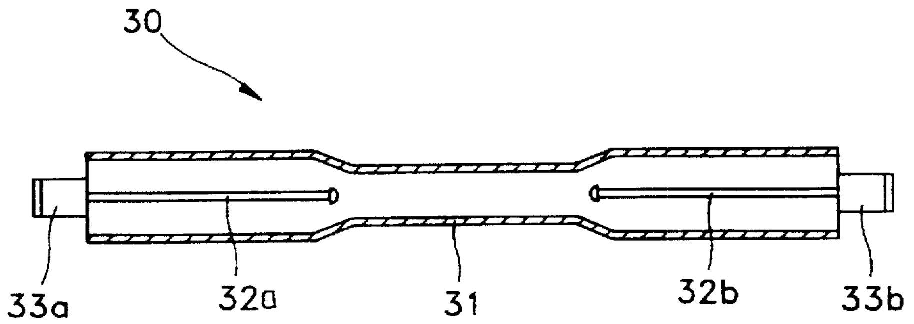
FIG.3(PRIOR ART)
FIG. 3 is a schematic diagram roughly showing the conventional xenon lamp.
Figure 4:
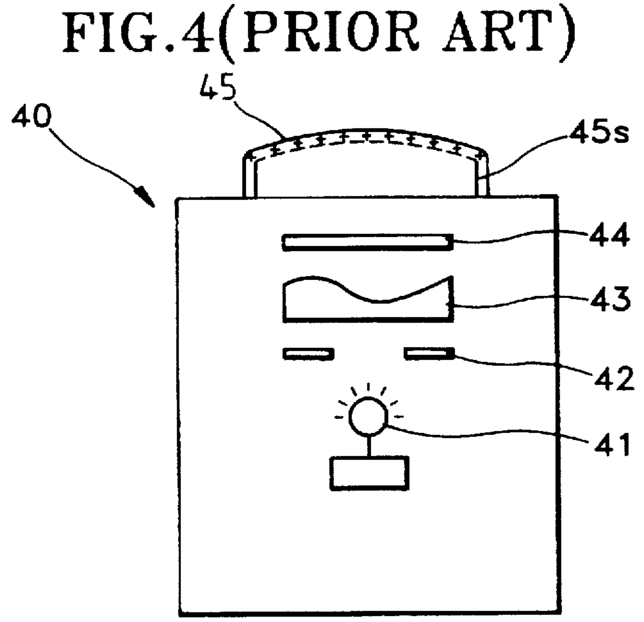
FIG.4(PRIOR ART)
FIG. 4 is a schematic diagram showing a conventional color cathode ray tube exposure apparatus.
Figure 8:
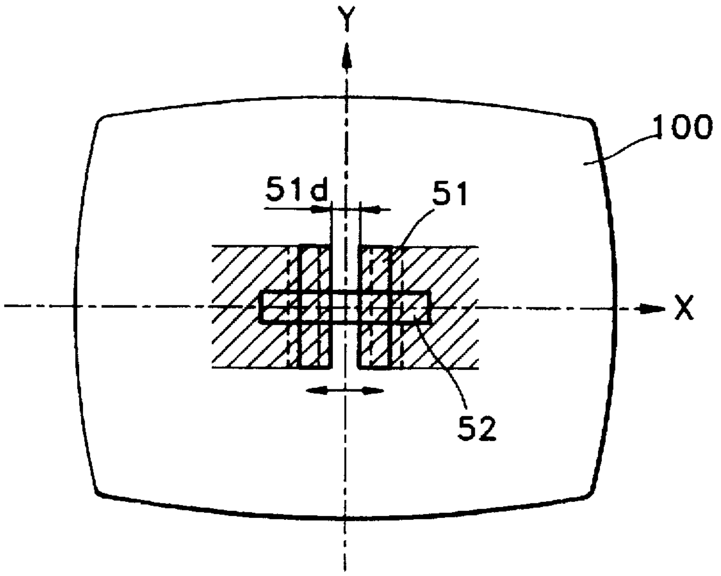
FIGS. 8 and 9 are views showing positional relationships between a lamp and slots with respect to a cathode ray tube panel in the color cathode ray tube exposing apparatus according to the present invention.
Figure 9:
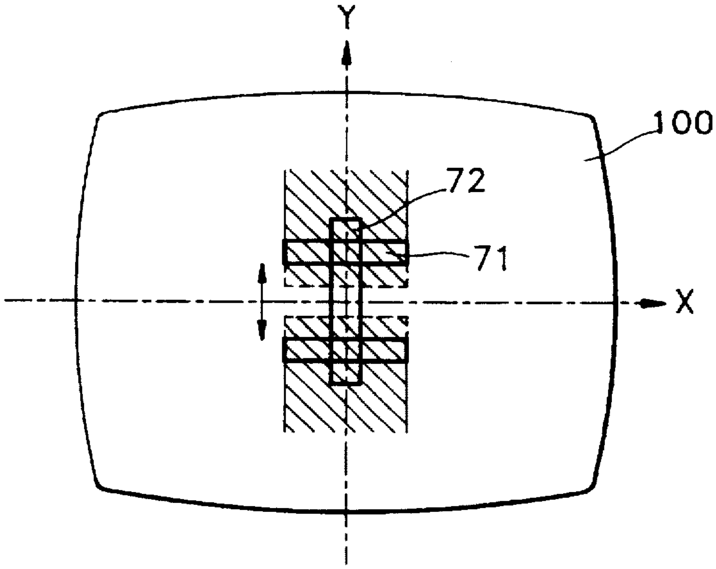

In FIG. 5, if electrical power is supplied to the lamp 52, the lamp 52 emits light rays, thereby exposing the inner surface of the panel of the color cathode ray tube 45 shown in FIG. 4. The light source supporting plate 53 is heated by the heat from lamp 52 and is cooled by the surrounding air. Here, a water cooling method can be employed for cooling light source supporting plate 53. In exposing the inner surface of the panel of the color cathode ray tube, an exposure pattern correction effect can be obtained by driving z-axis direction 56 and y-axis direction 57 cams. The cams, when driven, move simultaneously, each moving at a rate of one cycle every 0.5–1.5 seconds. According to the movement of cams 56 and 57, cam contact plate 55 moves in the directions of the y-axis and the z-axis, thereby simultaneously moving lamp 52 and plate 51 in the directions of the y-axis and the z-axis. Thus, the boundary of an assumed dot exposure pattern can be clarified by means of the movement in the z-axis direction, and the size of the assumed dot exposure pattern in the y-axis direction can be adjusted by the movement in the y-axis direction. The control of the x-axis direction size of the assumed dot exposure pattern can be obtained by adjusting (widening or narrowing) an opening width 51*d* of plate 51. Consequently, the circularity of the assumed dot pattern and the clarity of the boundary thereof can be adjusted, as shown in FIG. 8. In FIG. 8 showing positional relationships between lamp 52 and plate 51 with respect to the cathode ray tube panel 100, the x-axis direction size of the assumed dot can be adjusted by means of the control of the width 51*d* by widening and narrowing the slit 51 horizontally along lamp 52.

Figure 10:
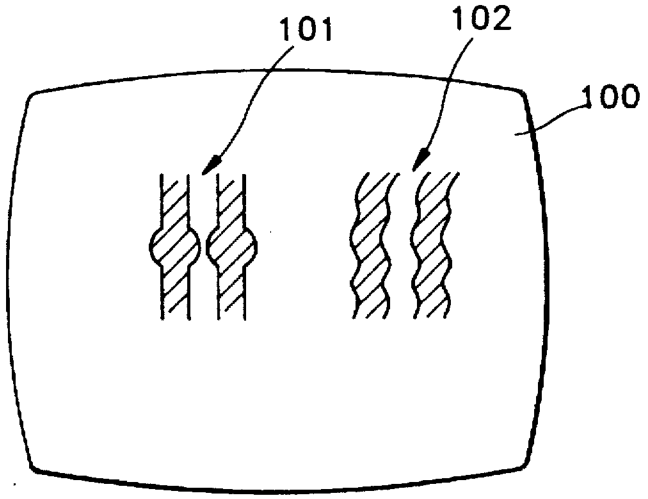
FIG. 10 is a view showing stripe distortions in a conventional stripe-type color cathode ray tube.
Figure 11:
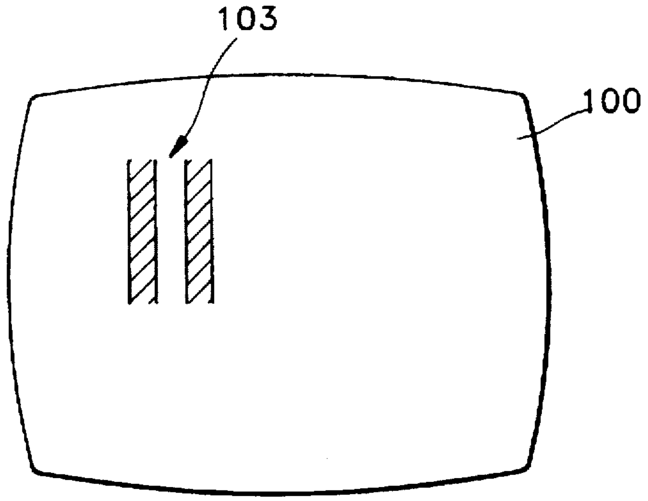
FIG. 11 is a view showing correction of the distorted stripes shown in FIG. 10, by means of the color cathode ray tube exposure apparatus according to the present invention.

In the case of the stripe-type cathode ray tube exposure apparatus, exposure is performed by the exposure apparatus shown in FIG. 7. Operational relationships of lamp 72, plate 71 and continuous light-emitting circuit 76 are the same as those of the FIG. 5 dot-type color cathode ray tube exposure apparatus, except for differences in the moving mechanism of lamp 72 and plate 71. That is, light source supporting plate 73 reciprocates in the y-axis direction on the basis of the center of the x-axis and y-axis shown in FIG. 9 by means of the y-axis direction cam 74. Here, it is desirable that the reciprocating movement occurs every 0.5–1.5 seconds, as in the case of the FIG. 5 dot-type exposure apparatus. Thus, middle-swollen stripe exposure pattern 101 or linearity-distorted stripe exposure pattern 102, as shown in FIG. 10, is corrected into stripe exposure pattern having precise linearity 103 shown in FIG. 11.

As described above, according to the present invention, there is provided a color cathode ray tube exposure apparatus having means for moving a light source in a particular direction, thereby improving the circularity of an assumed dot exposure pattern and the clarity of the boundary thereof, and the linearity of an assumed stripe exposure pattern formed in an exposing process for electro-photographically manufacturing the color cathode ray tube.

What is claimed is:

1. An apparatus for exposing an inner surface of a color cathode ray tube during manufacturing of the cathode ray tube, the apparatus comprising:
   - a light source for exposing an inner surface of a color cathode ray tube;
   - continuous light-emitting circuit means electrically connected to said light source for causing said light source to emit light continuously;
   - a slit arranged close to said light source for adjusting the size of an exposure pattern produced by said light source;
   - supporting means for supporting and fixedly holding said light source;
   - moving means coupled to said supporting means for moving said supporting means in first and second orthogonal directions.

2. The color cathode ray tube exposure apparatus according to claim 1, wherein said continuous light-emitting circuit means includes an auxiliary DC power source for causing said light source to emit light continuously.

3. The color cathode ray tube exposure apparatus according to claim 1, wherein said moving means includes at least one cam.

4. The color cathode ray tube exposure apparatus according to claim 1 wherein the first direction is parallel to light passing through the slit and the second direction is transverse to light passing through the slit.

5. An apparatus for exposing an inner surface of a color cathode ray tube during manufacturing of the cathode ray tube, the apparatus comprising:
   - a light source for exposing an inner surface of a color cathode ray tube;
   - continuous light-emitting circuit means electrically connected to said light source for causing said light source to emit light continuously;
   - a slit arranged close to said light source for adjusting the size of an exposure pattern produced by said light source;
   - supporting means for supporting and fixedly holding said light source;
   - moving means coupled to said supporting means for moving said supporting means in first and second orthogonal directions, said moving means comprising a cam assembly including a first cam coupled to said supporting means for moving said supporting means in the first direction, a cam supporting member supporting said first cam, and a second cam coupled to said cam supporting member for moving said supporting means in the second direction.

6. The color cathode ray tube exposure apparatus according to claim 5 wherein the first direction is parallel to light passing through the slit and the second direction is transverse to light passing through the slit.

7. An apparatus for exposing an inner surface of a color cathode ray tube during manufacturing of the cathode ray tube, the apparatus comprising:

a light source for exposing an inner surface of a color cathode ray tube;

continuous light-emitting circuit means electrically connected to said light source for causing said light source to emit light continuously;

a slit arranged close to said light source for adjusting the size of an exposure pattern produced by said light source;

supporting means for supporting and fixedly holding said light source;

moving means coupled to said supporting means for moving said supporting means wherein said moving means includes at least one cam and said supporting means includes a supporting plate supporting said light source, a contact plate coupled with said cam, a shaft disposed between and connected to said supporting plate and said contact plate, and first and second buffer springs disposed between and connected to said supporting plate and said contact plate.

* * * * *